(12) United States Patent
John

(10) Patent No.: US 7,881,560 B2
(45) Date of Patent: Feb. 1, 2011

(54) METHOD FOR DETERMINING THE POSITION OF A MARKER IN AN AUGMENTED REALITY SYSTEM

(75) Inventor: Ben St John, München (DE)

(73) Assignee: Siemens Aktiengesellschaft, Munich (DE)

( * ) Notice: Subject to any disclaimer, the term of this patent is extended or adjusted under 35 U.S.C. 154(b) by 726 days.

(21) Appl. No.: 11/587,469

(22) PCT Filed: Oct. 1, 2005

(86) PCT No.: PCT/EP2005/050072

§ 371 (c)(1),
(2), (4) Date: Oct. 25, 2006

(87) PCT Pub. No.: WO2005/104033

PCT Pub. Date: Nov. 3, 2005

(65) Prior Publication Data

US 2007/0242886 A1    Oct. 18, 2007

(30) Foreign Application Priority Data

Apr. 26, 2004  (EP) .................................. 04009877

(51) Int. Cl.
*G06K 9/32*    (2006.01)
(52) U.S. Cl. ...................................... 382/287; 345/633
(58) Field of Classification Search ................ 386/287;
345/633
See application file for complete search history.

(56) References Cited

U.S. PATENT DOCUMENTS 4,875,165 A * 10/1989 Fencil et al. ................ 345/424

2002/0094189 A1    7/2002  Navab et al.
2003/0107647 A1 *  6/2003  James ........................ 348/116

OTHER PUBLICATIONS

Takashi Okuma et al, An Augmented Reality System Usng a Real-time Vision Based Registration, IEEE 1998.*
Mathias Mohring et al, Video See-Through AR on Consumer Cell-Phones, IEEE 2004.*
Shahzad Malik, Gerhard Roth and Chris McDonald, "Robust 2D Tracking for Real Time Augmented Reality", Procedures of Vision Interface, 2002, Calgary, Alberta, Canada, pp. 399-406.
A. Ansar and K. Daniilidis, "Linear Solutions for Visual Augmented Reality Registration", IEEE Symposium for Augmented Reality 2001, pp. 183-184, Abstract.
Hirokazu Kato and Mark Billinghurst, "Marker Tracking and HMD Calibration for a Video-Based Augmented Reality Conferencing System", 2$^{nd}$ IEEE and ACM International Workshop on Augmented Realitly, 1999, p. 85.

(Continued)

*Primary Examiner*—Wesley Tucker
*Assistant Examiner*—Mark Roz

(57) ABSTRACT

The invention relates to a method for determining a position of a marker in an Augmented Reality System. After detection of the marking points of a marker in a captured image, marker vectors are determined using the marking points of the marker, and the distance of the marker from a capturing unit is calculated using the determined marker vectors. The determined distance and marker vectors are used in order to establish a rotation matrix reproducing an orientation of the marker in relation to the capturing unit, wherein the simplification that all marking points of the marker are located at the same distance from the capturing unit is valid and the signs of the rotation matrix are derived from substantially parallel marker vectors.

8 Claims, 2 Drawing Sheets

OTHER PUBLICATIONS

J. Rekimoto, "Matrix: A Realtime Object Identification and Registration Method for Augmented Reality", Third Asian Pacific Computer and Human Interaction, Japan, Jul. 15-17, 1998, Los Alamitos, CA, USA, IEEE Comput. Soc., Jul. 15, 1998, pp. 63-68, XP010295091, Abstract.

* cited by examiner $$V = [\vec{V}_0 \ \vec{V}_1] = \begin{bmatrix} x_0 & x_1 \\ y_0 & y_1 \end{bmatrix} = \begin{bmatrix} \vec{x} \\ \vec{y} \end{bmatrix} \text{ with}$$

$$\vec{V}_0 = \begin{bmatrix} x_0 \\ y_0 \end{bmatrix}; \vec{V}_1 = \begin{bmatrix} x_1 \\ y_1 \end{bmatrix}; \vec{x} = [x_0 \ x_1]; \vec{y} = [y_0 \ y_1], \text{ whereby}$$

$$|\vec{V}_0| = \frac{\overline{v0\_a} + \overline{v0\_b}}{2}; |\vec{V}_1| = \frac{\overline{v1\_a} + \overline{v1\_b}}{2}$$

METHOD FOR DETERMINING THE POSITION OF A MARKER IN AN AUGMENTED REALITY SYSTEM

CROSS REFERENCE TO RELATED APPLICATIONS

This application is the US National Stage of International Application No. PCT/EP2005/050072, filed Jan. 10, 2005 and claims the benefits of European Patent application No. 04009877.4 filed Apr. 26, 2004. All of the applications are incorporated by reference herein in their entirety.

FIELD OF THE INVENTION

The present invention relates to a method for determining a position, i.e. a distance and an orientation, of a marker in an augmented reality system and especially to a method for determining a position of a marker which can be used for mobile terminals such as mobile phones or PDAs.

BACKGROUND OF THE INVENTION

Augmented reality represents a new area of technology in which for example additional visual information is simultaneously overlaid onto a current optical perception of the real environment. In such cases a basic distinction is made between the so-called "see-through" technology in which the user looks through a transparent image display into the real environment for example, and the so-called "feed-through" technology, in which the real environment is captured for example by a camera and is mixed before reproduction on a display unit with a computer-generated virtual image.

As a result, a user simultaneously perceives both the real environment and also the virtual image elements generated for example by computer graphics as a combined display (sum image). This mixture of real and virtual image components for augmented reality makes it possible for the user to perform his actions by directly including the overlaid and thus simultaneously perceptible additional information.

So that an augmented reality is also possible in mobile situations position changes of the user (e.g. through turning, change of location, change of body attitude and angle of view) are measured and included in the currently generated image reproduction. This capturing of the changes of position can be executed with a plurality of technologies, such as for example mechanical, magnetic, optical and acoustic sensors through to evaluation of the GPS (Global Positioning System) for capturing a change of position.

Of particular interest for augmented reality systems within mobile terminals are so-called video-based techniques or "tracking methods". In this case optically perceivable elements of the real environment are used for determining a change of position of the user or of the capturing unit capturing the real environment. Such elements are referred to as a rule as "markers" which are provided and encoded specifically for capturing a position change.

These types of tracking method for evaluation of markers in an augmented reality environment are for example known from literature references S. Malik et al.: "Robust 2D Tracking for Real Time Augmented reality", Procedures of Vision Interface, 2002 and also J. Rekimoto: "Matrix Real Time Object Identification and Registration Method for Augmented Reality", Procedures of Vision Interface, July 1998.

Furthermore a method for object detection is described in literature reference A. Ansar, et al.: "Linear Solutions for Visual Augmented Reality Registration", IEEE Symposium for Augmented Reality 2001", which provides reduced error susceptibility through the use of predetermined estimation algorithms.

Thus, with conventional augmented reality systems, a very high computing power is required to record the environment visualized by the user together with the tracking data of a marker, in order to incorporate virtual images, if possible in real time, into the environment captured by the capturing unit. Above and beyond this, these demands on computing power are further increased by the information provided by a data processing unit from databases, which are to be incorporated to augment the real environment, and their process visualization by creation of virtual components (e.g. computer graphics, animations, video sequences etc.). Only with the appropriate processing speed is a sum image made up of the real image and computer-generated virtual image components produced for the user in the display unit, which because of the small delay is perceived as augmented reality.

A major reason for the high computing power usually required lay especially in the nature of the method used for determining a position of a marker in an augmented reality system relative to a capturing unit or camera. Previously so-called "trial and error" approximations were executed, in which case a reference image of the marker is used and a transformation is applied to this in order to compare the transformed image with the image actually captured. This process is executed iteratively until such time as a sufficiently good match between transformed image and recorded image is available.

These types of augmented reality systems were as a result restricted only to large computers with almost unlimited resources and especially a very high computing power.

SUMMARY OF THE INVENTION

The object of the invention is thus to create a method for determining the position of a marker in an augmented reality system which is very simple, has a very low susceptibility to errors and is thus very efficient.

In accordance with the invention this object is achieved by the measures of the claims.

In particular by detecting marking points of a marker in a captured image, determining marker vectors from the marking points of the marker, determining a distance between the marker and the capturing unit using the marker vectors and determining a rotation matrix for specifying an orientation of the marker using the distance and the marker vectors determined, whereby the leading sign of the rotation matrix is derived from the relevant substantially parallel marker vectors and furthermore the simplification applies that all corner points of the marker have the same distance from the capturing unit, enables a positioning determining with very few computing operations and with a low susceptibility to errors to be executed. It is thus especially suitable for mobile terminals such as for example telecommunication terminals with their limited resources.

Preferably the marker has a rectangular and especially a square shape, with the marking points of the marker representing its corner points. These types of marking points can be detected especially simply, which further simplifies the determination of the associated marker vectors.

For implementing the simplification of an equal distance between all corner points and the capturing unit, the substantially parallel marker vectors are arithmetically averaged to create average marker vectors. This type of simplification can as a result also be implemented with very few computing steps.

The still unknown leading signs of the rotation matrix can furthermore be estimated or derived from the degree of non-parallelism of the substantially parallel marker vectors, which produces the major saving in computing operations. In particular the degree of non-parallelism is computed from the normalized length and direction of the vector cross product of the substantially parallel marker vectors, which enables just a few computing operations to be used to also estimate the still missing leading signs for resolving the rotation matrix.

To put it more precisely the still unknown leading signs of the normal vector, i.e. the third column, of the rotation matrix are determined from the product of the degree of non-parallelism with the average marker vector. The further still unknown leading signs of the rotation matrix can then be determined very simply on the basis of the restrictions or peripheral conditions applying for an orthonormal matrix.

Further advantageous embodiments of the invention are identified in the further subclaims.

BRIEF DESCRIPTION OF THE DRAWINGS

The invention will be explained below in greater detail on the basis of an exemplary embodiment which refers to the drawing.

The Figures show.

DETAILED DESCRIPTION OF THE INVENTION

The invention is described below using a two-dimensional (2D) marker as well as three-dimensional (3D) calculation specifications, in which case, for implementing a very simple and fast method for position determination, which is especially suitable for example for mobile terminals such as mobile telephones and PDAs, assumptions are made to simplify the explanation. In this case the overall size or the dimensions of the captured marker or image of the marker, the angle of the actual right-angle marker appearing in the captured image and also the length difference of the parallel sides of the captured marker are used. The invention thus follows the basic idea of setting up a system of equations which restricts the possible camera positions or marker positions to a camera position in which the resulting image of the marker is obtained.

The terms camera position or marker position are used below as equivalent terms since essentially a relative positioning of the capturing unit or camera to the marker used is involved. A position is taken below to mean a prespecified distance and also a prespecified orientation of the marker relative to the capturing unit. The two major assumptions of the invention are in this case that an average distance of the marker from the capturing unit is used for the determination or calculation and that furthermore the relevant dimensions of parallel sides of the marker continue to be used for resolving ambiguities, especially in respect of the leading sign of the transformation or rotation matrix produced, as will be described in detail below.

Figure 1:
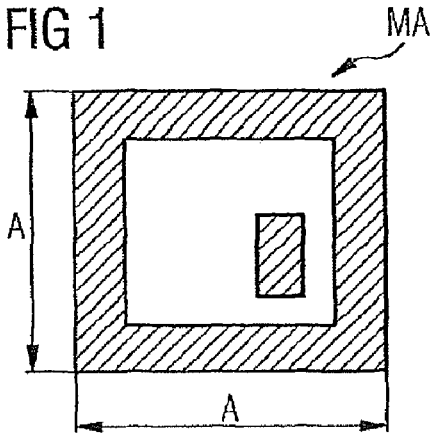
FIG. 1 a simplified drawing of a marker as used in the inventive method.

FIG. 1 shows a simplified diagram of a marker or sign as is used in this invention for example. These types of marker are specifically provided for tracking and have a particular form which allows especially simple detection both of the marker as a whole and also of its position or location and orientation.

The marker MA used in FIG. 1 has a rectangular form with sides parallel to one another, with preferably a square form with the same length of side or a dimension A. Although the rectangular or square form of the marker MA is already entirely adequate for the present invention, the marker has a further flat area within it which is for example offset from a corner. These types of further features of the marker MA make capturing or detection of the marker easier within a captured environment or surroundings for example. The data of this marker MA is usually used by the method as reference data or is known in advance to the latter.

Figure 2:
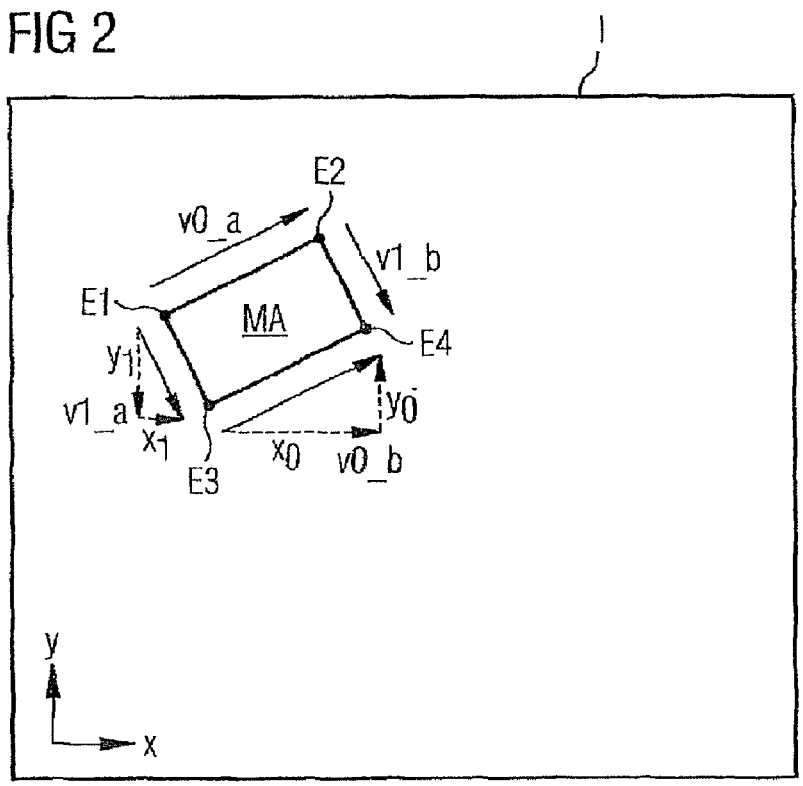
FIG. 2 a simplified drawing of a captured image with captured markers for illustrating the relevant marker vectors.

FIG. 2 shows a simplified diagram of an image I of the captured environment with a captured marker MA as well as associated marker vectors, as are used by the present method.

With the method used to determine the position of a marker in an augmented reality system, two steps are basically employed, with the first involving finding the marker MA within the image I and then the positioning of the marker MA being determined relative to the capturing unit or camera.

Since the present invention solely relates to the positioning of the marker MA, it is assumed below that the first step, namely the finding of the marker MA within the image I, has already been undertaken and that for example the marking points of the marker, which for example represent its corner points E1 to E4, are already known.

Starting from this marking point or the corner points E1 to E4 of the marker MA, the marker vectors corresponding to a relevant marking point or corner point are now determined or calculated.

In accordance with FIG. 2 this produces the marker vectors $v0\_a$ from corner point E1 to corner point E2, the marker vector $v1\_b$ from corner point E2 to corner point E4, the marker vector $v1\_a$ from corner point E1 to corner point E3 and the marker vector $v0\_b$ from corner point E3 to corner point E4. A relevant marker vector is made up in this case of its x and y components, with for example the marker vector $v1\_a$ consisting of the vectors $x_1$ and $y_1$, whereas the marker vector $v0\_b$ consists of the vectors $x_0$ and $y_0$, wherein $x_1$ and $y_1$, $x_0$ and $y_0$ also represent the x- or y-components of the average marker vectors as described in paragraph [00031].

To implement the inventive simplification, whereby all marking points or corner points E1 to E4 are at the same distance from the capturing unit, the substantially parallel marker vectors of the mapped marker MA are first averaged to create average marker vectors $V_0$ and $V_1$. The term "substantially parallel marker vectors" is taken below to mean the vectors assigned to opposite sides of the marker MA, which run precisely in parallel when the marker is viewed at right angles, but can be at a certain angle if the marker or the camera are turned or tilted in relation to one another.

The preferably arithmetic averaging of the two opposite and substantially parallel marker-vectors produces the average marker vectors $V_0$ and $V_1$ with the notation shown in FIG. 2, which defines the mapped marker MA on the display unit or in the image I in simple terms as V=[V0 V1].

The simplification described here or the generation of the average marker vectors can be executed with very simple steps, which means that only low computing power is necessary.

Using this simplification as its starting point, an equation is now set up which describes the recorded image V of the marker MA within the image I. As a result the following applies:

$$S \times C \times M = V,$$

with S representing a scaling factor, which is associated with a distance d between marker MA and the capturing unit, a camera or marker orientation C, which reflects a rotation or inclination of the marker relative to the camera, as well as a reference position M of the marker MA, which is produced from the marker used, and for a two-dimensional marker represents a 2×3 matrix.

Written out, this equation produces:

$$\begin{bmatrix} d & 0 & 0 \\ 0 & d & 0 \end{bmatrix} \begin{bmatrix} e_{00} & e_{01} & e_{02} \\ e_{10} & e_{11} & e_{12} \\ e_{20} & e_{21} & e_{22} \end{bmatrix} \begin{bmatrix} 1 & 0 \\ 0 & 1 \\ 0 & 0 \end{bmatrix} = \begin{bmatrix} x_0 & x_1 \\ y_0 & y_1 \end{bmatrix}$$

with $e_{00}$ to $e_{22}$ as values of the transformation matrix C, in which case because of the two-dimensional (2D) representation of the marker MA on the image I, a 2×3 matrix is used for the scaling factor S and a 3×2 matrix for the reference position M of the marker. After this matrix equation has been multiplied out, a plurality of simple equations is obtained for each term, such as:

$$de_{00} = x_0$$

Using these simple equations the values $e_{00}$, $e_{01}$, $e_{10}$ and $e_{11}$ can be resolved and inserted into the matrix for the camera or marker transformation or orientation C, which produces the following matrix:

$$\tilde{C} = \begin{bmatrix} \frac{x_0}{d} & \frac{x_1}{d} & e_{02} \\ \frac{y_0}{d} & \frac{y_1}{d} & e_{12} \\ e_{20} & e_{21} & e_{22} \end{bmatrix}$$

This camera or marker transformation or orientation C now represents a pure rotation matrix which means that it is orthonormal. This produces a plurality of restrictions or peripheral conditions, namely:

$$e_i \cdot e_i = 1$$

$$e_i \cdot e_j = 0 \text{ iff } i \neq j$$

$$e_i \times e_i = 0$$

$$e_i \times e_j = \pm e_k \text{ iff } i \neq j$$

From these peripheral conditions or restrictions the complete matrix C can now be calculated or determined with the exception of the leading signs of a few entries. Thus the camera or marker transformation C now has the following form:

$$\tilde{C} = \begin{bmatrix} e_{0\_} \\ e_{1\_} \\ e_{2\_} \end{bmatrix} = \begin{bmatrix} \frac{x_0}{d} & \frac{x_1}{d} & \pm\sqrt{1 - \frac{\overline{X}^2}{d^2}} \\ \frac{y_0}{d} & \frac{y_1}{d} & \pm\sqrt{1 - \frac{\overline{Y}^2}{d^2}} \\ \pm\sqrt{1 - \frac{V_0^2}{d^2}} & \pm\sqrt{1 - \frac{V_1^2}{d^2}} & \frac{\vec{V}_0 \times \vec{V}_1}{d^2} \end{bmatrix}$$

wherein $\frac{\overline{X}^2}{d^2} = \left(\frac{x_0}{d}\right)^2 + \left(\frac{x_1}{d}\right)^2$ and $\frac{\overline{Y}^2}{d^2} = \left(\frac{y_0}{d}\right)^2 + \left(\frac{y_1}{d}\right)^2$, the distance $d^2$ being calculated in accordance with the following equation:

$$d^2 = ((V_0^2 + V_1^2) + ((V_0^2 + V_1^2)^2 - 4(\vec{V}_0 \times \vec{V}_1)^2)^{1/2})/2,$$

These calculation steps too require a comparatively small processing outlay, which means that the method requires a low computing power and in addition can be executed very quickly.

The last column of rotation matrix C, which describes the orientation of the capturing unit relative to the marker MA, represents what is known as the normal vector of the marker MA which is divided by the distance d. In particular the leading sign of the entries of this normal vector however continue to be unknown and must accordingly be resolved. The following heuristic method is thus used for resolving the leading sign for the x and y components of this normal vector.

This heuristic method makes use of the fact that a the edges of the marker MA lying nearer the capturing unit are longer than the edges of the marker MA further away from the capturing unit. This further means that the actual parallel edges or sides of the marker MA do not appear as such in the mapped marker, and depending on a rotation or inclination of the marker, exhibit deviations from the parallel arrangement.

To take account of these situations in the most general possible way the following strategy is adopted. The degree of non-parallelism is calculated using the standardized length and the direction (+/−z) of the vector cross product of the two (theoretically) parallel sides or marker vectors. This degree of non-parallelism determined is subsequently multiplied by the average marker vector of the two substantially parallel marker vectors, which produces a result proportional to the normal marker vector in this direction. This calculation is executed for both pairs of the substantially parallel marker vectors and a sum is formed from this. The largest, i.e. most significant component (x or y) is then used to define the unknown leading signs for the normal vector or the third column of the rotation matrix C. In more precise terms this means, when the result features a large positive x component and a small negative y component, the leading sign of the x component of the normal vector will be defined as positive.

Once again using the existing restrictions or peripheral conditions which apply for an orthonormal matrix, the remaining unknown leading signs (in the first and second column) can now be simply determined or calculated.

Figure 3:
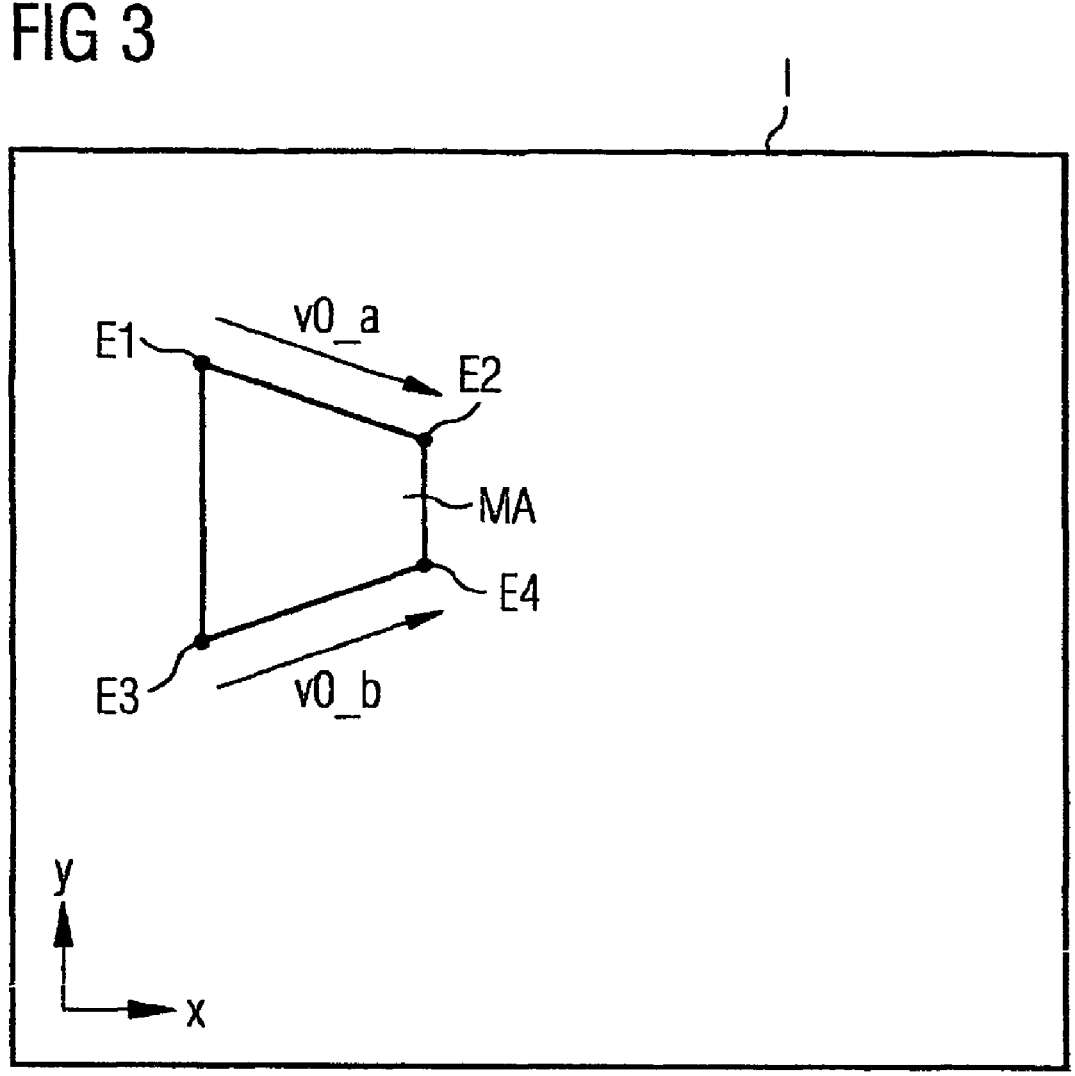
FIG. 3 a simplified drawing of a captured image with captured markers for illustrating the inventive estimation of the unknown leading signs in the rotation matrix.
Figure 3:
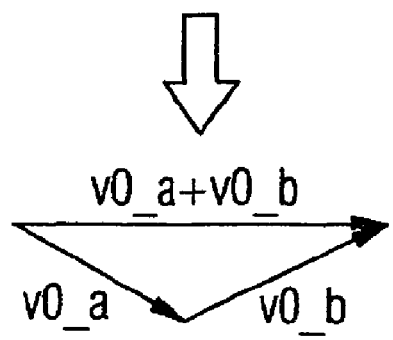

FIG. 3 shows a simplified diagram of an image I with a captured marker MA to illustrate the heuristic method described here, in which case the substantially parallel marker vectors v0_a and v0_b are first added to each other in order to determine an average marker vector V0 from the result. This value is further multiplied by the vector cross product of the two substantially parallel marker vectors v0_a and v0_b and in the same way the method is executed for the further substantially parallel marker vectors not shown. Using this summation result as its starting point and using the most significant components x or y, the leading sign of the x and y components in the third column of the orthonormal matrix is determined or estimated.

In this way an extraordinarily efficient method for position determination of markers is obtained. To put it more precisely, the speed can be improved by a factor of more than 1000 since in particular the duration of the calculation is restricted to just a few arithmetic operations per marker or marker vector and in particular is independent of the image size or the size of the mapped marker. In changes in the positions of markers relative to a camera in an augmented reality system can be executed for the first time with mobile terminals under realtime conditions which usually requires only low-level resources and especially a low computing power. For future telecommunications devices in particular, such as mobile phones, methods for implementing an augmented reality can consequently be implemented for the first time.

Since the method discussed here is essentially based only on easy-to-detect marking points of the marker MA, as well as the low computing power or the extraordinarily high speed, an extraordinarily high error immunity can also be established which allows an especially robust operation.

The invention has been described above on the basis of a rectangular or square marker. It is not restricted to this however and can be applied in the same manner to other shapes of marker, especially three-dimensional markers.

The invention claimed is:

1. A method for determining a position of a marker in an augmented reality system of a mobile terminal, comprising:
    capturing a plurality of marking points of the marker in a captured image where the marking points of the marker are at a same distance from a capturing unit;
    determining a plurality of marker vectors from the marking points of the marker;
    determining a distance from the marker to the capturing unit using the marker vectors; and
    determining a rotation matrix for specifying an orientation of the marker relative to the capturing unit using the distance determined and the marker vectors,
        wherein a leading sign of the rotation matrix is derived from the marker vectors that are parallel to one another, and
        wherein a plurality of leading signs of the rotation matrix are derived from a degree of non-parallelism of the parallel marker vectors,
    wherein a degree of non-parallelism is calculated from a standardized length and a direction of a vector cross product of the parallel marker vectors, and
    wherein the distance and the orientation of the marker are determined in order to determine a change of position of the mobile terminal.

2. The method as claimed in claim 1, wherein the marker is represented as a rectangle and the marking points represent corner points.

3. The method as claimed in claim 2, wherein to implement a simplification parallel marker vectors are averaged to generate average marker vectors.

4. The method as claimed in claim 3, wherein the distance d of the marker from the capturing unit is defined by:

$$d = (((V_0^2 + V_1^2)((V_0^2 + V_1^2)^2 - 4(\vec{V}_0 \times \vec{V}_1)^2)^{1/2})/2)^{1/2}$$

wherein $\vec{V}_0$ and $\vec{V}_1$ represent the average marker vectors of the marker, and wherein $V_0^2$ and $V_1^2$ represent the squared average marker vectors of the marker.

5. The method as claimed in claim 4, wherein the rotation matrix C has the following form for specifying the orientation of the marker:

$$\tilde{C} = \begin{bmatrix} \dfrac{x_0}{d} & \dfrac{x_1}{d} & \pm\sqrt{1 - \dfrac{\overline{X}^2}{d^2}} \\ \dfrac{y_0}{d} & \dfrac{y_1}{d} & \pm\sqrt{1 - \dfrac{\overline{Y}^2}{d^2}} \\ \pm\sqrt{1 - \dfrac{V_0^2}{d^2}} & \pm\sqrt{1 - \dfrac{V_1^2}{d^2}} & \dfrac{\vec{V}_0 \times \vec{V}_1}{d^2} \end{bmatrix}$$

wherein $\dfrac{\overline{X}^2}{d^2} = \left(\dfrac{x_0}{d}\right)^2 + \left(\dfrac{x_1}{d}\right)^2$ and $\dfrac{\overline{Y}^2}{d^2} = \left(\dfrac{y_0}{d}\right)^2 + \left(\dfrac{y_1}{d}\right)^2$, wherein $\vec{V}_0$ and $\vec{V}_1$ represent the average marker vectors of the marker, wherein $V_0^2$ and $V_1^2$ represent the squared average marker vectors of the marker, wherein d represents the distance from the marker to the capturing unit, and wherein $x_0$, $x_1$, $y_0$ and $y_1$ represent the x- or y-components of the average marker vectors.

6. The method as claimed in claim 1, wherein the leading signs of the normal vector of the rotation matrix are determined from the product of the degree of non-parallelism with the average marker vector.

7. The method as claimed in claim 6, wherein the further leading signs of the rotation matrix are determined based on a restriction applicable for an orthonormal matrix.

8. The method as claimed in claim 1, wherein the mobile terminal is a telecommunications terminal.

* * * * *